United States Patent [19]

Eastwick et al.

[11] Patent Number: 6,052,685
[45] Date of Patent: Apr. 18, 2000

[54] INTEGRATION OF LEGACY DATABASE MANAGEMENT SYSTEMS WITH ODBC-COMPLIANT APPLICATION PROGRAMS

[75] Inventors: Michael W. Eastwick, Duvall; Gregory K. Miskin, Redmond, both of Wash.

[73] Assignee: Mosaix, Inc., Redmond, Wash.

[21] Appl. No.: 08/910,765

[22] Filed: Aug. 13, 1997

[51] Int. Cl.$^7$ ................................................. G06F 17/30
[52] U.S. Cl. .................. 707/10; 707/1; 707/103
[58] Field of Search ................................. 707/1, 10, 103

[56] References Cited

U.S. PATENT DOCUMENTS

| | | | |
|---|---|---|---|
| 5,611,076 | 3/1997 | Durflinger et al. | 707/102 |
| 5,642,515 | 6/1997 | Jones et al. | 395/727 |
| 5,689,698 | 11/1997 | Jones et al. | 707/4 |
| 5,713,014 | 1/1998 | Durflinger et al. | 707/4 |
| 5,749,079 | 5/1998 | Yong et al. | 707/100 |
| 5,752,027 | 5/1998 | Familiar | 707/103 |
| 5,754,841 | 5/1998 | Carino et al. | 707/3 |
| 5,794,250 | 8/1998 | Carino, Jr. et al. | 707/104 |
| 5,796,393 | 8/1998 | MacNaughton et al. | 345/329 |
| 5,826,253 | 11/1999 | Bredenberg | 707/2 |
| 5,918,224 | 6/1999 | Bredenberg | 707/1 |
| 5,991,751 | 11/1999 | Bredenberg | 707/1 |

OTHER PUBLICATIONS

Finkelstein, ODBC: Beware the Hype, Client Server Databases; Network Computing, pp. CS3–CS4, Jan. 1994.

Read, WWW in an Open Office System, Client Server Computing, International Semina on IEE Digest No. 1995/184 vol. 1, pp. 16/1–16/5, Oct. 1995.

Rishe, Managing Network Resources for Efficient Reliable Information, Parallel and Distributed Information Systems, Sep. 1994., Proceedings of the Third International Conference, pp. 223–226.

Rumba® Tools for HLLapi–WinHLLAPI, Wall Data Inc., Kirkland, Wa., 1995, pp. 2–1–3–13 and 6–1–6–163.

ODBC 2.0 Programmer's Reference and SDK Guide, Microsoft Press, Redmond, Wa., 1994, pp. 3–15, 23–87, and 181–519.

Primary Examiner—Hosain T. Alam
Assistant Examiner—Frantz Coby
Attorney, Agent, or Firm—Seed IP Law Group

[57] ABSTRACT

A database integrator is provided to an application program that utilizes the ODBC interface so as to enable the application program to access the data in a legacy DBMS. The application program ("the client program") is located on a workstation, and the legacy DBMS is located on a host computer. The legacy DBMS is used primarily by an application program ("the server program"). The database integrator receives ODBC commands from the client program, and unlike database drivers interacting with non-legacy DBMSs that send SQL statements to the DBMS, the database integrator instead converts these commands into server program-specific commands to manipulate the user interface of the server program, establishes a connection with the server program over a terminal emulation session, and issues the server program-specific commands to the server program by using the terminal emulator. These server program-specific commands manipulate the server program's user interface to display the appropriate data so that the database integrator can then access it. In this manner, the database integrator accesses the data in the legacy DBMS indirectly by issuing user interface commands to the server program, because the database integrator cannot typically access the legacy DBMS directly. This indirect access enables the client program to gain access to the data in a database that it would not otherwise be able to access.

7 Claims, 11 Drawing Sheets

INTEGRATION OF LEGACY DATABASE MANAGEMENT SYSTEMS WITH ODBC-COMPLIANT APPLICATION PROGRAMS

TECHNICAL FIELD

The present invention relates generally to data processing systems and, more particularly, to the integration of legacy databases with ODBC-compliant application programs.

BACKGROUND OF THE INVENTION

Many of today's application programs utilize the Open Database Connectivity (ODBC) interface to access data in Database Management Systems (DBMSs) using the Structured Query Language (SQL). The ODBC interface provides interoperability, where a single application program can access data from many different DBMSs. This interoperability allows an application developer to develop, compile, and ship an application program without targeting a specific DBMS. When a user then buys the application program, the user can add modules, known as database drivers, which link the application program to the user's choice of DBMSs. The ODBC interface is more clearly described in *ODBC 2.0 Programmer's Reference and SDK Guide*, Microsoft Press (1994), at pages 3–15, 23–87, and 181–519.

When accessing a DBMS using the ODBC interface, an application program utilizes various functions of the interface to issue ODBC commands containing SQL statements to the database driver, which then sends the SQL statements to the DBMS. After receiving the SQL statements, the DBMS processes them. Although the ODBC interface provides interoperability, many existing DBMSs (known as legacy DBMSs) either do not have an ODBC database driver for use with an ODBC-compliant application program or do not allow access from entities other than a single application program that acts as the legacy DBMS's only client. In both of these situations, an ODBC-compliant application program cannot access the data contained in the legacy DBMS. Because there are many legacy DBMSs, this limitation is significant, as the limitation renders the data in these legacy DBMSs inaccessible. It is therefore desirable to integrate legacy DBMSs with application programs that utilize the ODBC interface.

SUMMARY OF THE INVENTION

A database integrator is provided to an application program that utilizes the ODBC interface so as to enable the application program to access the data in a legacy DBMS. The application program ("the client program") is located on a workstation, and the legacy DBMS is located on a host computer. The legacy DBMS is used primarily by an application program ("the server program"). The database integrator receives ODBC commands from the client program, and unlike database drivers interacting with non-legacy DBMSs that send SQL statements to the DBMS, the database integrator instead converts these commands into server program-specific commands to manipulate the user interface of the server program, connects to the server program over a terminal emulation session, and issues the server program-specific commands to the server program by using the terminal emulator. These server program-specific commands manipulate the server program's user interface to display the appropriate data so that the database integrator can then access it. In this manner, the database integrator accesses the data in the legacy DBMS indirectly by issuing user interface commands to the server program, because the client program cannot typically access the legacy DBMS directly. This indirect access enables the client program to gain access to the data in a database that it would not otherwise be able to access.

In accordance with a first aspect of the present invention, a method is provided in a data processing system for a client computer program on a workstation to access data stored in a database of a host computer. The database is maintained by a server computer program. In accordance with this method, an ODBC command is received from the client computer program, where the ODBC command requests access to the data of the database stored in the host computer. The ODBC command is converted into user interface commands for the server computer program, and the user interface commands are issued to the server computer program to perform the access of the data requested by the ODBC command.

In accordance with a second aspect of the present invention, a method is provided in a data processing system for an integration component to facilitate client program access of data maintained in a database by a server program. The integration component receives a database access request from the client program to directly access the data in the database. The integration component further converts the database access request into a command suitable for the server program and issues the command to the server program to effectuate the database access request to access the data in the database.

In accordance with a third aspect of the present invention, a data processing system is provided comprising a host computer and a workstation. The host computer includes a secondary storage device containing a database with data, a memory containing a server program that manages the database, and a processor for running the server program. The workstation includes a memory containing a client program that issues database commands to directly access the data in the database and an integrator component for receiving the database commands, for converting the database commands into application-specific commands for the server program, and for issuing the application-specific commands to the server program to effectuate the data access requested by the client program. The workstation further includes a processor for running the client program and the integrator component.

DETAILED DESCRIPTION OF THE INVENTION

An exemplary embodiment of the present invention provides an application program with a database integrator that utilizes the Open Database Connectivity (ODBC) interface so as to enable the application program to access the data in a legacy Database Management System (DBMS). In an exemplary embodiment, the application program ("the client program") is located on a workstation, such as a P.C., and the legacy DBMS is located on a host computer, such as a mainframe. The legacy DBMS is maintained by an application program ("the server program"). That is, the server program is the primary mechanism for accessing the data in the legacy DBMS, and it performs this role by displaying the data of the legacy DBMS on its user interface. The database integrator provides access to the data of the legacy DBMS by issuing commands to the server program via a terminal emulation session. In other words, rather than issuing database commands like the Structured Query Language (SQL) directly to the DBMS to access the data, the database integrator instead sends commands to the server program so that the server program displays the appropriate data on its user interface, and then the database integrator accesses the data from the user interface. In this manner, the database integrator accesses the data in the legacy DBMS indirectly via the server program, thus providing the client program with access to the data in the legacy DBMS.

To perform database integration, the exemplary embodiment provides a driver, known as the database integrator, that receives ODBC commands from the client program, that converts these commands into server program user interface commands, that connects to the server program over a terminal emulation session, and that issues the server program user interface commands to the server program by using the terminal emulator. In order to convert the commands, the exemplary embodiment maintains a conversion database that maps the various data displayed by the server program to the commands that need to be issued against the server program so that the server program will display the data. This database is easily constructed by using a navigator program, which is further described below.

Although the exemplary embodiment is described below as providing a client program on a workstation with access to data in a legacy DBMS on a host computer using a terminal emulator, one skilled in the art will appreciate that an alternative embodiment may provide a client program with access to a legacy DBMS that is on the same computer. In the alternative embodiment, instead of using a terminal emulator, the database integrator may send well-known window messages to the server program to issue commands. Window messages are well-known by programmers who develop programs in a Windows® environment.

Figure 1:
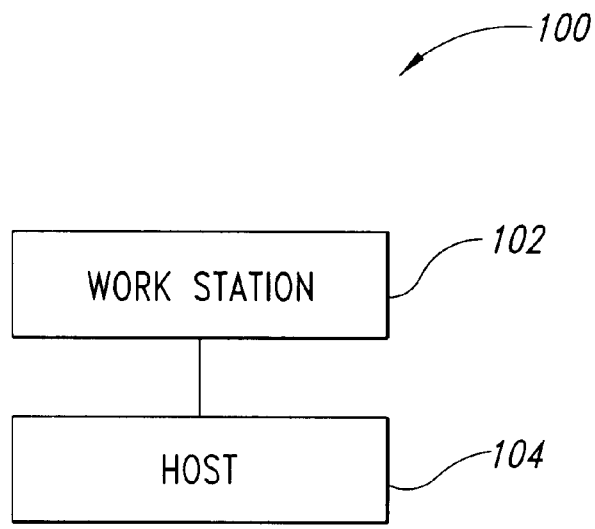
FIG. 1 depicts a data processing system that is suitable for practicing an exemplary embodiment of the present invention.

FIG. 1 depicts a data processing system 100 that is suitable for practicing an exemplary embodiment of the present invention. The data processing system 100 includes a workstation 102 that is communicatively connected to a host computer 104. The workstation 102 may be communicatively connected to the host computer 104 via any communication connection, such as a direct connection, a local area network, or a wide area network.

Figure 2:
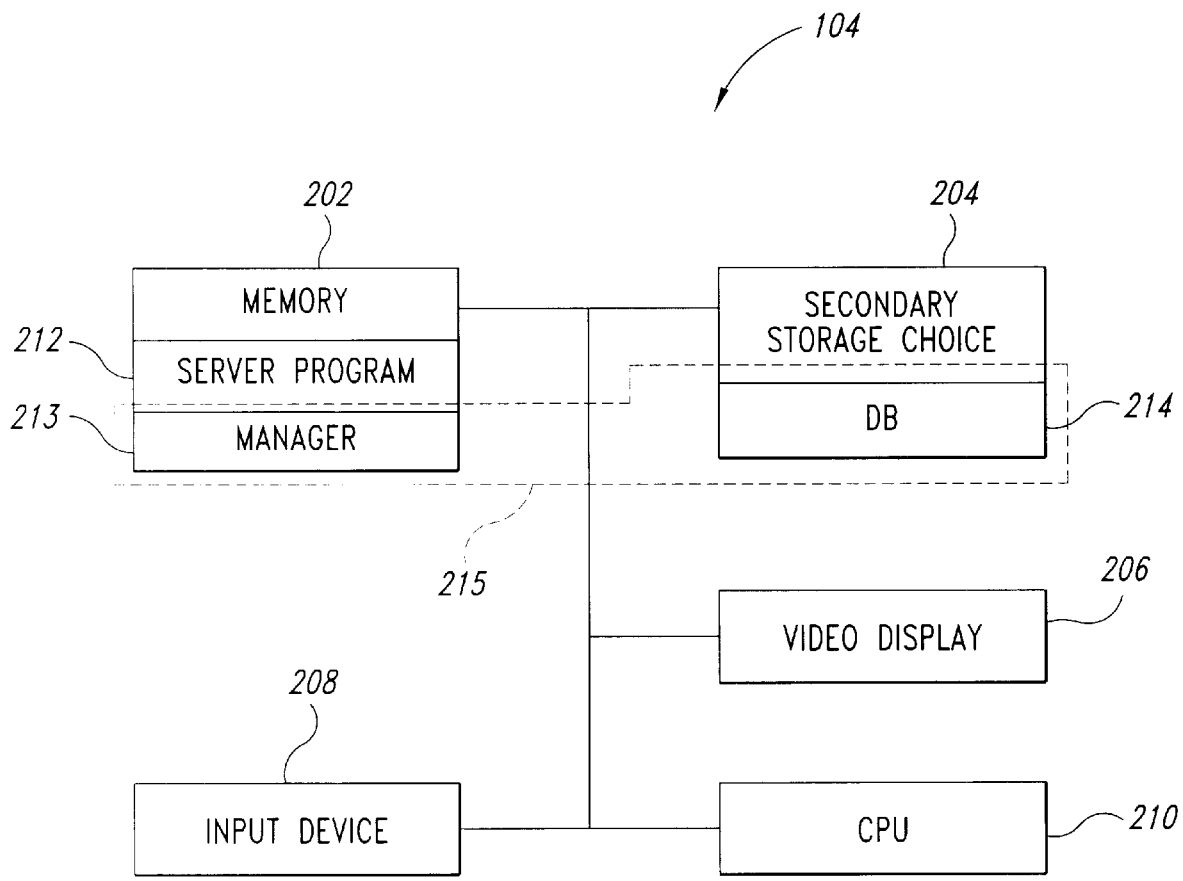
FIG. 2 depicts a more detailed diagram of the host computer system depicted in FIG. 1.

FIG. 2 depicts a more detailed diagram of the host computer 104. The host computer 104 includes a memory 202, a secondary storage device 204, a video display 206, an input device 208, and a central processing unit (CPU) 210. The memory 202 contains a server program 212 and a manager program 213. The server program 212 displays to the user the data of a database 214 on the secondary storage device 204. The manager program 213 constitutes one part of a legacy DBMS 215, and the database 214 constitutes another part. The database 214 contains the data for the legacy DBMS. The manager program 213 queries and updates the database 214. One skilled in the art will appreciate that in some DBMS architectures, the manager program 214 is a library of functions utilized by the server program 212. The database 214 contains data that is typically inaccessible from the workstation 102 because either an ODBC driver has not been created for the legacy DBMS 215 or the legacy DBMS does not allow access from programs other than the server program.

Figure 3:
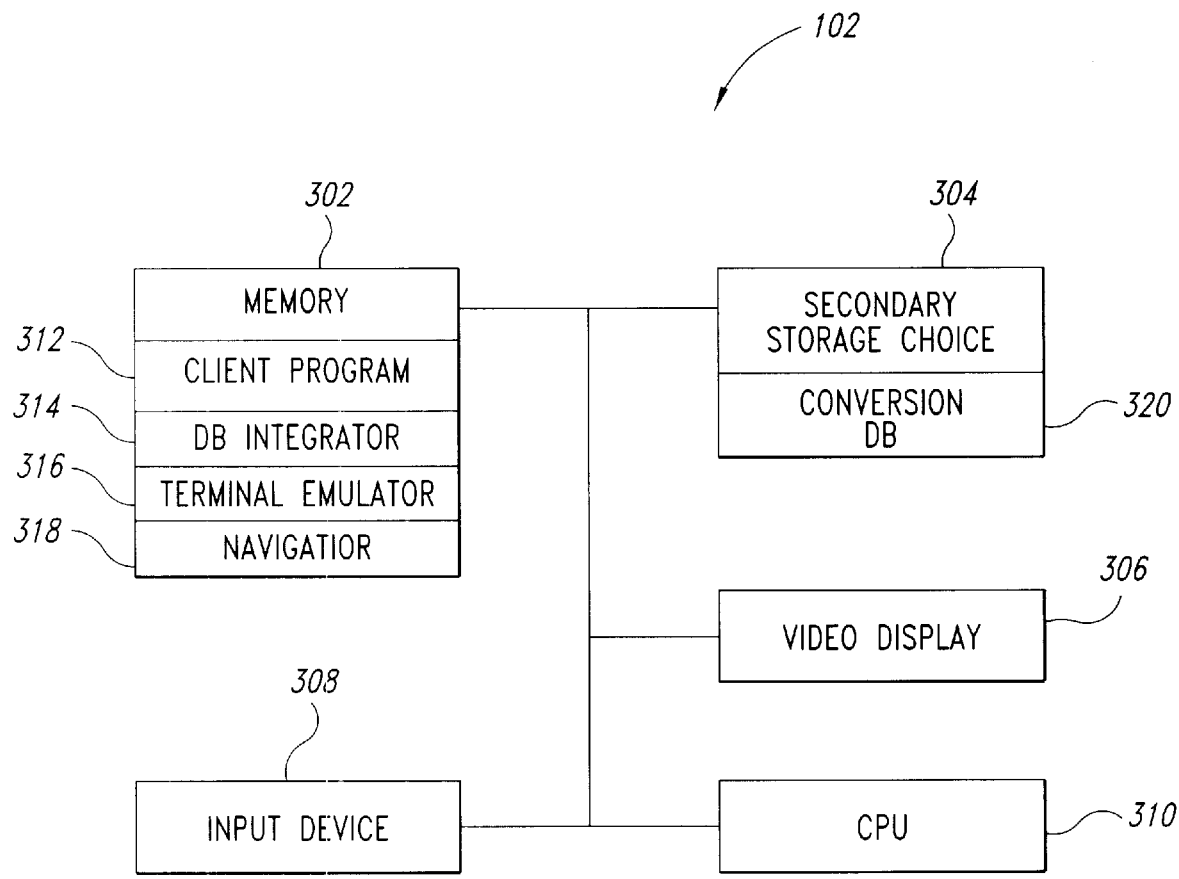
FIG. 3 depicts a more detailed diagram of the workstation depicted in FIG. 1.

FIG. 3 depicts a more detailed diagram of the workstation 102 of FIG. 1. The workstation 102 includes a memory 302, a secondary storage device 304, a video display 306, an input device 308, and a central processing unit (CPU) 310. The memory 302 contains a client program 312, a database integrator 314 of an exemplary embodiment, a terminal emulator 316, and a navigator program 318. The secondary storage device 304 contains a database 320, known as the conversion database. The client program 312 is responsible for invoking an ODBC interface provided by the database integrator 314, so that the client program can access the data in the legacy DBMS 215 on the host 104. The database integrator 314 is a Dynamically Linked Library (DLL) that is linked into the address space of the client program 312 at run time. The database integrator 314 receives an ODBC command from the client program 312, accesses the conversion database 320 to convert the ODBC command into various user interface commands of the server program 212 so as to satisfy the ODBC command, and passes these user interface commands to the terminal emulator 316. The terminal emulator 316 in turn issues the user interface commands to the server program 212. An example of a terminal emulator suitable for use with an exemplary embodiment is the Rumba terminal emulator available from Wall Data Corporation of Kirkland, Washington. To issue these user interface commands to the terminal emulator 316, the database integrator 314 utilizes the WinHLLAPI interface provided by the Rumba terminal emulator. WinHLLAPI is a standard interface defined for programmatically issuing commands via the terminal emulator 316 to a program that it is emulating. An example of the WinHLLAPI interface is described in greater detail in *Rumba Tools for HLLapi- WinHLLAPI*, Wall Data Inc. (1995), at pp. 2-1-3-13 and 6-1-6-163. The navigator 318 is responsible for creating the conversion database 320 that contains the server program user interface commands to retrieve the data from the legacy DBMS 215. One skilled in the art will appreciate that, instead of using a database, the information contained in the conversion database 320 may be provided by other entities, such as objects.

Figure 4:
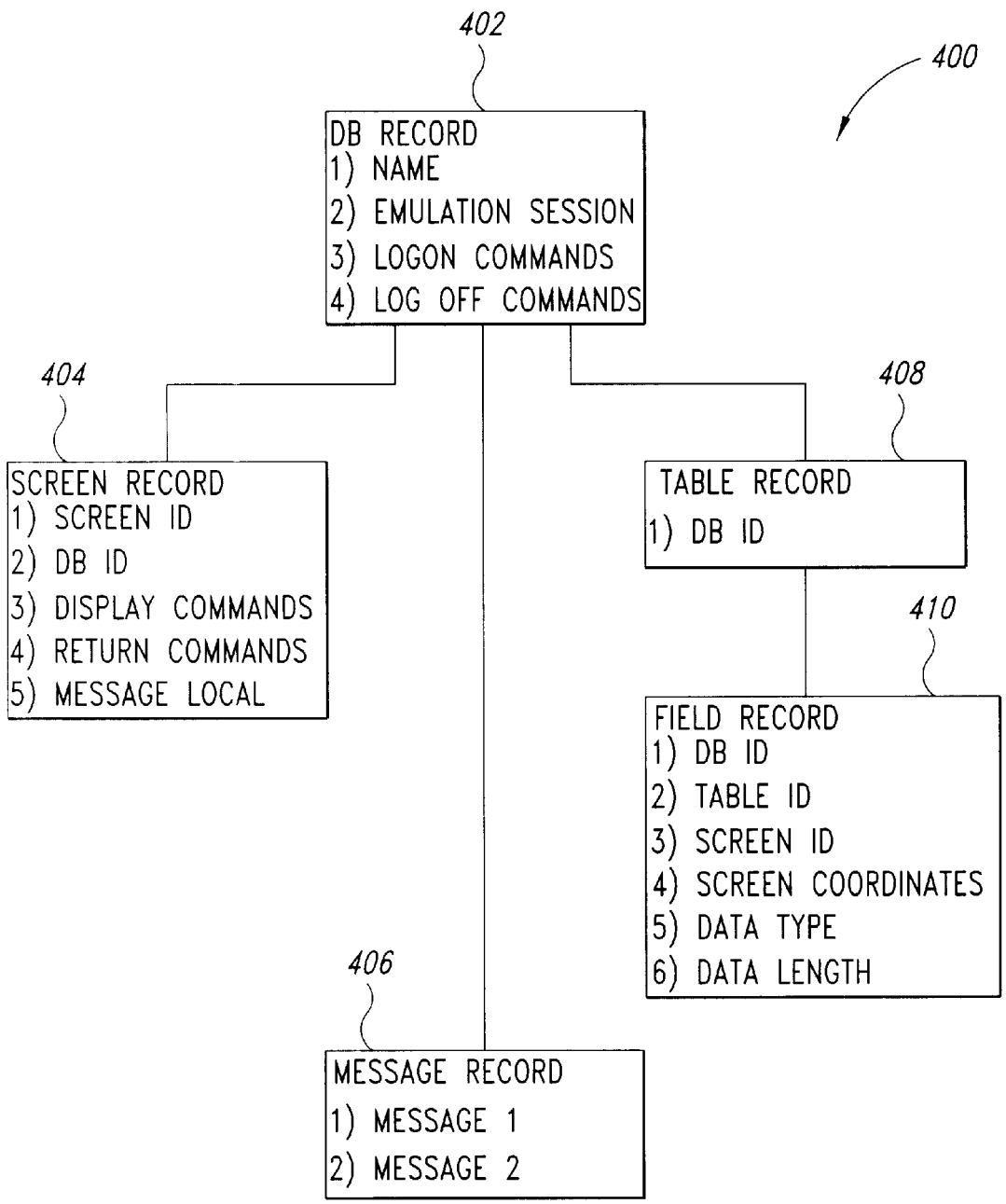
FIG. 4 depicts the schema of the database depicted in FIG. 3.

The conversion database 320 is defined in terms of a server program and the location of where the data of the server program's database is displayed by the server program user interface. The server program 212 displays a user interface with a number of screens, which start with a main screen and which may be traversed by a user to both view and edit the data contained in the server program's database (i.e., the legacy DBMS 215). To better understand the operation of the conversion database 320, various terms relative to the conversion database need to be defined: a server program is considered to be a "database" because it provides access to all of the data that the client program may wish to access, a logical grouping of various data on various screens are considered to be a "table," and various data of a table are considered to be "fields." These concepts are best explained when describing the schema 400 of the conversion database 320, which is depicted in FIG. 4. The schema 400 comprises one database record 402 for each server program on the host computer 104 that the client program wishes to access. The database record 402 contains various information for a given server program including: (1) a name associated with the server program, (2) an identifier of the emulation session used for communicating with the server program, (3) the commands that perform a logon to the server program and (4) the commands that perform a logoff of the server program. These logon and logoff commands are the actual keystrokes necessary to logon and logoff of the server program and are further described below.

Associated with each database record 402 is a number of screen records 404, only one being shown in FIG. 4. Each screen record 404 has (1) an indication of the screen with which it is associated, (2) an indication of the database with which it is associated, (3) the commands that cause the server program to display the screen associated with the screen record 404 from a main screen, (4) the commands that cause the server program to return to the main screen after displaying the screen associated with the screen record, and (5) an indication of where all messages appear on the associated screen. That is, most screens have a predesignated area, such as the title bar of a window, where all messages are displayed, and the location of this area is stored in the screen record so that the database integrator may return important messages, like error messages, to the client program.

Figure 5:
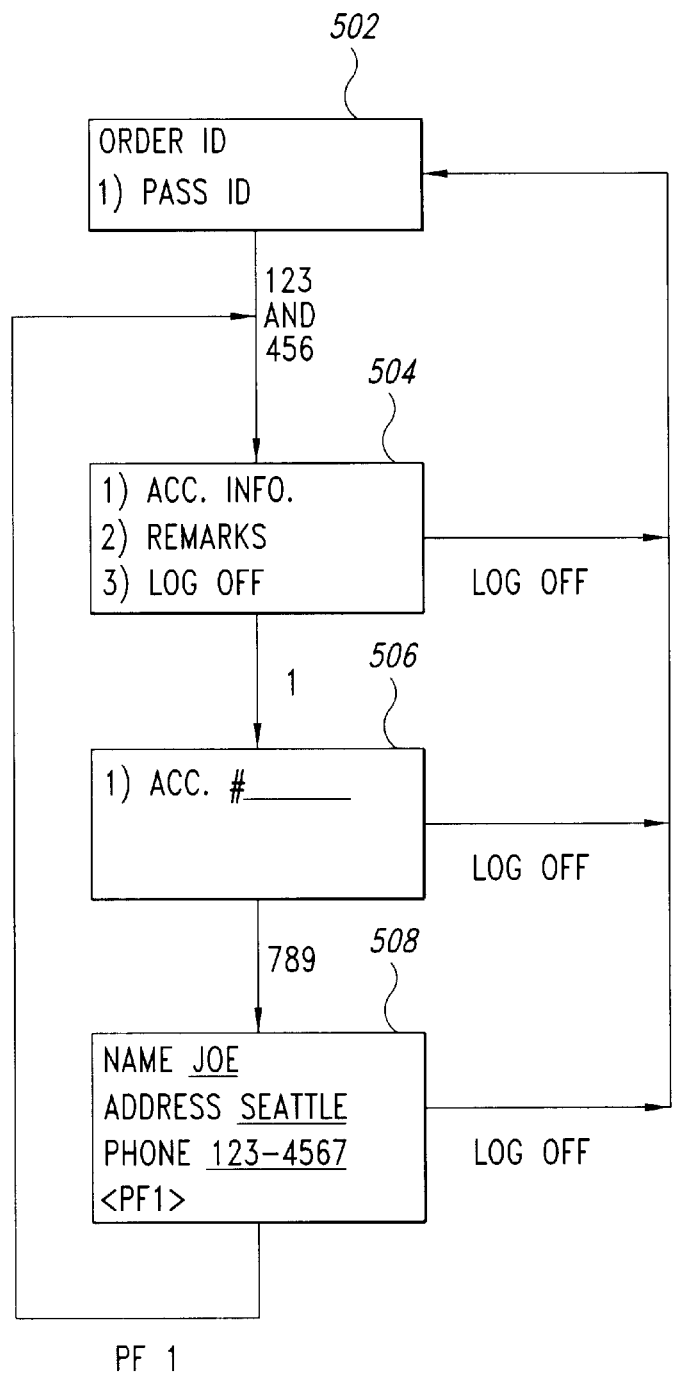
FIG. 5 depicts a sequence of exemplary screens and the commands utilized to traverse between these screens.

To better illustrate logon commands, logoff commands, and the commands that cause the server program to display a particular screen and to return from a particular screen, consider FIG. 5, which depicts a sequence of screens 502–508 of an example server program. Screen 502 is the logon screen, and in this screen, both the user ID and the password of the user are required to logon to the server program. Upon entering both the user ID and the password of the user, a main screen 504 is displayed. Therefore, in this example, if the user ID were "123" and the password were "456," the logon commands of the server program include: "123, tab, 456, carriage return." Additionally, since inputting "logoff" from any of the screens 504–508 logs the user off of the server program, the logoff commands of the server program are "logoff, carriage return."

From the main screen 504, an account information screen 506 may be selected by entering a "1." Upon entering a "1" from the main screen 504, the account information screen 506 is displayed, which requests the account number (e.g., 789) for a particular user account. Upon entering the account number, screen 508 is displayed which displays the name, address, and phone number of the user account number "789." Additionally, screen 508 indicates that by pressing the PF1 key, the server program will proceed to the main screen 504. Based on this example, in the screen record 404 for screen 508, the commands necessary to display this screen from the main screen 504 include: "1, carriage return, 789, carriage return," because these are the commands necessary to go to screen 508 from the main screen 504. And, in the screen record 404 for screen 508, the commands necessary to return to the main screen 504 from screen 508 include "PF1," because depression of the PF1 key causes the server program to return to the main screen 504 from screen 508.

Referring again to FIG. 4, in addition to screen records 404, a message record 406 and a table record 408 are associated with the database record 402. The message record 406 contains a listing of all messages that the application program displays, and the table record 408 contains an indication of the database record 402 with which it is associated. Associated with the table record 408 is a field record 410 for each field or piece of data contained in the table. The field record 410 contains the information for the fields that are associated with a particular table. Each field record 410 contains (1) an indication of the database record 402 with which it is associated, (2) the table record 408 with which it is associated, (3) the screen record 404 with which it is associated, (4) the screen coordinates (i.e., the row and column of the screen) of where the field is located on its associated screen, (5) the type of data that the field contains (e.g., integer), and (6) the length of the data (e.g., four digits). Given the information contained in the conversion database 320, when a client program requests to either read or write the data for a particular field, to satisfy the request, the database integrator 314 can determine which screen the field is located on by accessing the field record 410, the commands necessary to get to that screen by accessing the appropriate screen record 404, and the location of the field on that screen from the field record. Additionally, the database integrator can monitor the messages displayed by the server program and return these messages to the client program.

Figure 6:
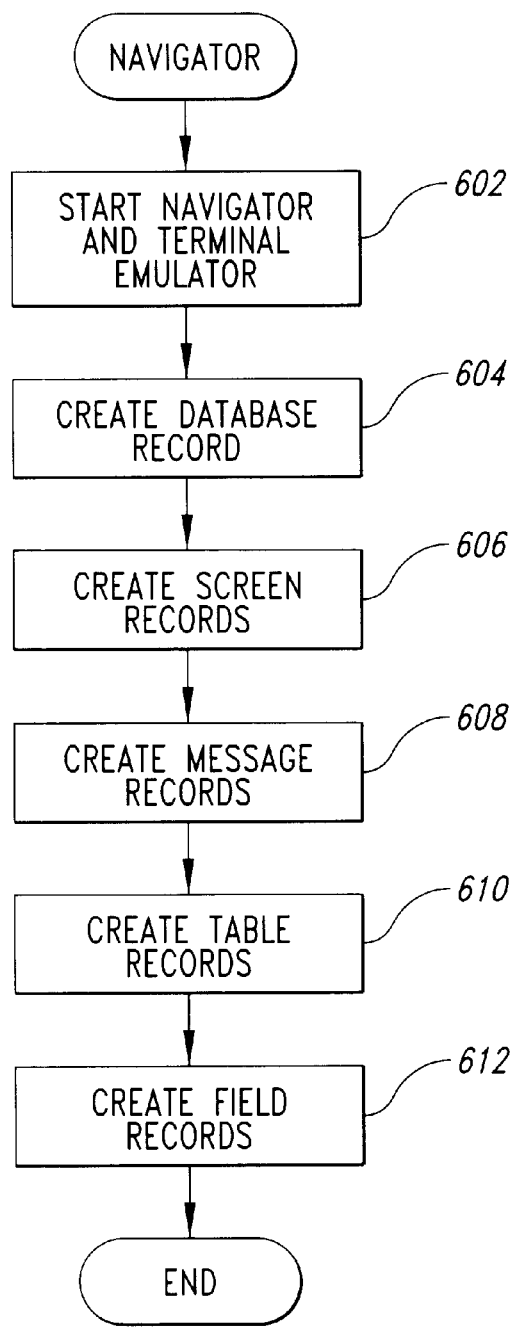
FIG. 6 depicts a flowchart of the steps performed when utilizing the navigator depicted in FIG. 3.
Figure 7:
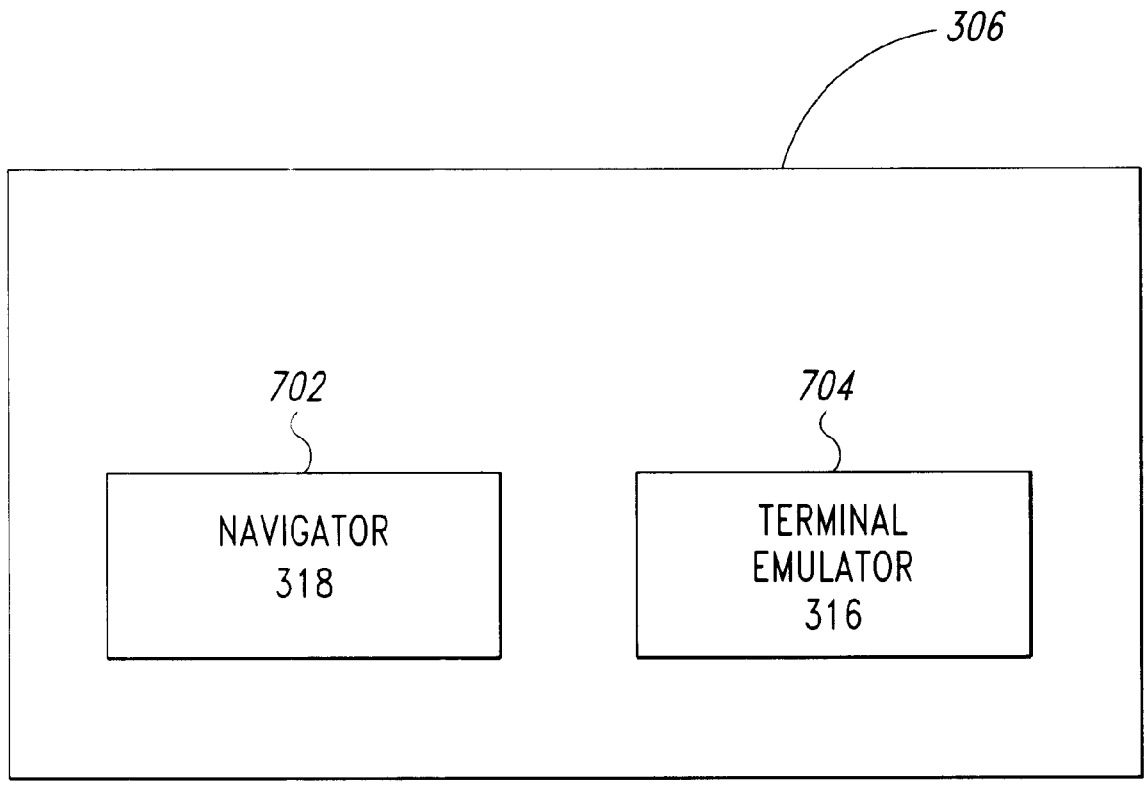
FIG. 7 depicts the video display of FIG. 3 displaying the navigator user interface and the terminal emulator user interface.

FIG. 6 is a flowchart of the steps performed when utilizing the navigator 318 to create the conversion database 320. The first step performed is for the user to start the navigator program and the terminal emulator 316 (step 602). In this step, as shown in FIG. 7, the navigator 318 displays a user interface 702 on the video display 306, and the terminal emulator 316 also displays a user interface 704 on the video display. The navigator user interface 702 provides various dialog boxes, one dialog box corresponds to each record 402–410 in the conversion database 320. The user traverses these dialog boxes and enters the requested information so as to create the records of the conversion database 320. In conjunction with the navigator user interface 702, the user utilizes the terminal emulator user interface 704 to identify the location of data on the screens, the commands necessary to traverse between the screens, and various other information necessary for the records of the conversion database 320.

After starting both the navigator 318 and the terminal emulator 316, the user creates the database record 402 (step 604). Utilizing the navigator's user interface 702, the user inputs the fields of the database dialog box that correspond to the database record 402 of the conversion database 320. These fields include the name of the database (or server program) associated with the database record 402, an identifier of the terminal emulation session, and both the logon commands and logoff commands of the server program.

After creating the database record 402, the user creates the screen records 404 for each screen displayed by the server program (step 606). In this step, the user utilizes the terminal emulator user interface 704 to traverse through each screen of the server program, and for each screen encountered, the user creates a screen record 404 utilizing the navigator user interface 702. In this step, the user inputs an identifier of the screen, an identifier of the database with which the screen in associated, the commands necessary to display this screen from the main screen, and the commands necessary to return to the main screen from this screen.

After creating the screen records 404, the user creates the message records 406 (step 608). When creating the message records, the user utilizes a message dialog box and inputs all of the messages displayed by the server program. After creating the message records 406, the user creates the table records 408 (step 610). In this step, the user defines tables, which are logical groupings of various pieces of data displayed by the screens of the server program. A table is not restricted to any one screen; rather, a table may contain data from more than one screen. The user then inputs the data for the table records 408 using the navigator user interface 702.

After creating the table records, the user creates the field records 410 by locating each field on a particular screen and storing the information for this field into a field dialog box displayed by the navigator user interface 702 (step 612). In this step, the user stores the screen coordinates of where the field is located on the screen, the data type, the data length, and an indication of the database, table, and screen with which it is associated. After creating the field records 410, the conversion database 320 is complete and may be used by the database integrator 314 of an exemplary embodiment to access data of a legacy DBMS via the server program. One skilled in the art will appreciate that the navigator may operate in numerous other ways. For example, the navigator may capture all keystrokes made to the terminal emulator so as to facilitate the input of the commands necessary to display a particular screen.

As stated above, ODBC is an interface specification. In order to support ODBC, a driver provides a number of functions that an application program can invoke so as to issue SQL statements to a target database. There are many functions defined depending upon the level of conformance to the ODBC standard that the driver provides. Of these functions, only a few need special implementations for use in the database integrator of the exemplary embodiment. The other functions can use a standard implementation as provided by the Dr. Deebee software product available from Syware Inc. of Cambridge, Mass. The functions that require a special implementation include the SQLconnect function, the SQLdisconnect function, the SQLgetdata function, and the SQLputdata function. The implementation of each of these functions is described below. By utilizing these functions of the database integrator 314, a client program can access the data displayed by a server program. For example, the client program first invokes the SQLconnect function to logon to the server program via the terminal emulator 316. Then, the client program may invoke either the SQLgetdata or SQLputdata function any number of times to either read data or update data, respectively. After invoking the SQLgetdata or SQLputdata function, the application program invokes the SQLdisconnect function to logoff of the host application program.

Figure 8:
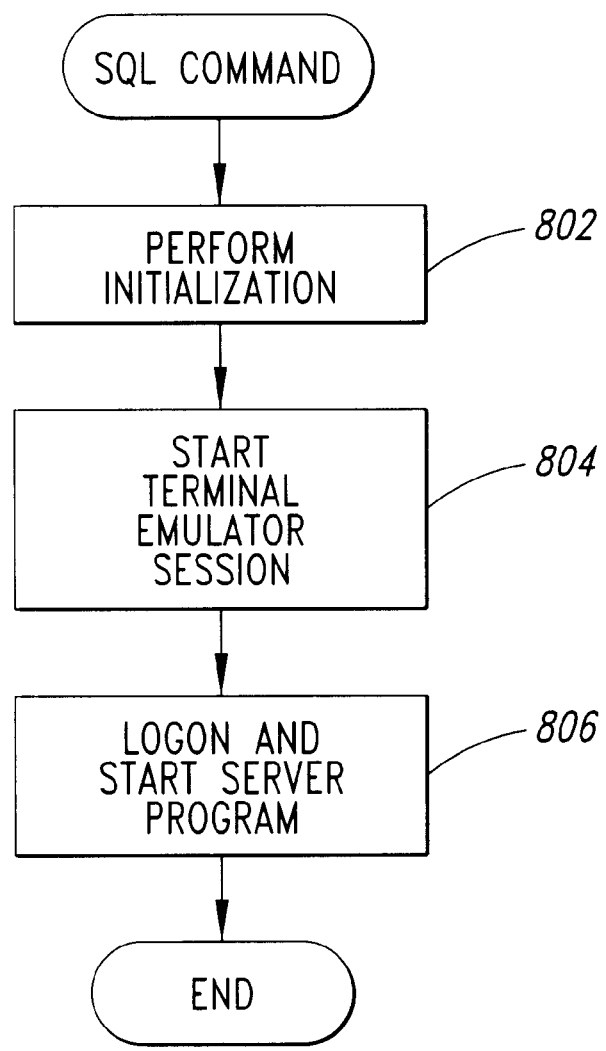
FIG. 8 depicts a flowchart of the steps performed by the SQLconnect function of the database integrator of FIG. 3.

FIG. 8 depicts a flowchart of the steps performed by the SQLconnect function of the database integrator 314 of an exemplary embodiment. The first step performed by the SQLconnect function is to perform initialization (step 802). In this step, the SQLconnect function invokes the "startup" function of the WinHLLAPI library to initialize the DLL that contains the WinHLLAPI functions. After performing initialization, the SQLconnect function starts a terminal emulation session by invoking the "WinHLLAPI" function and setting one of its parameters to "connect presentation space" which starts a terminal emulation session (step 804). In this step, it is assumed that the terminal emulator has already been started and is running. After starting the terminal emulation session, the SQLconnect function logs onto the server program (step 806). In this step, the SQLconnect function accesses the conversion database 320 to obtain the database record 402 for the server program. This database record 402 contains the logon commands of the server program. After receiving these commands, the commands are issued to the server program via the terminal emulation session using the WinHLLAPI "sendkey" function and the WinHLLAPI "sendstring" function which pass the appropriate commands and appropriate text, respectively, to the server program as if they were typed from a keyboard of the host computer. At the completion of this step, the main screen of the server program is accessible.

Figure 9:
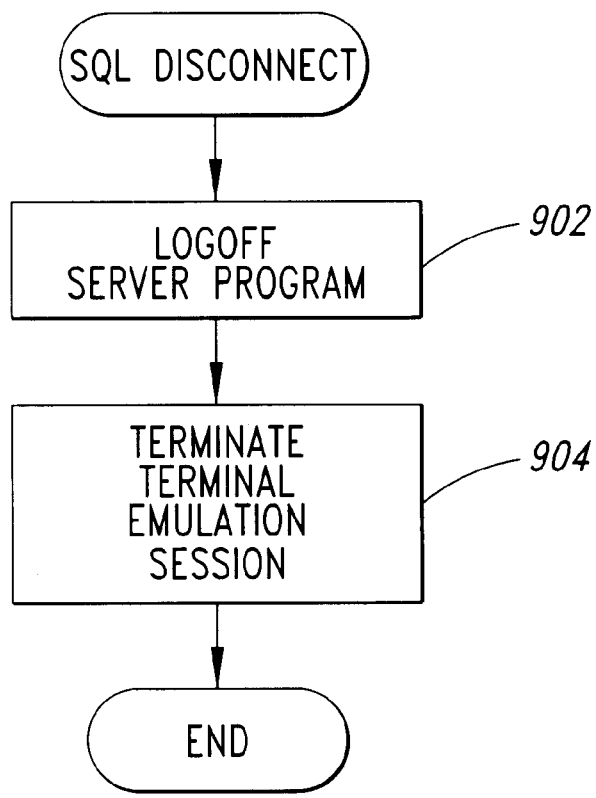
FIG. 9 depicts a flowchart of the steps performed by the SQLdisconnect function of the database integrator of FIG. 3.

FIG. 9 depicts a flowchart of the steps performed by the SQLdisconnect function of the database integrator 314 of the exemplary embodiment. The first step performed by the SQLdisconnect function is to logoff of the server program (step 902). In this step, the SQLdisconnect function accesses the conversion database 320 to obtain the database record 402 which contains the appropriate logoff commands. These commands are then issued to the server program via the terminal emulation session by using WinHLLAPI sendkey and sendstring functions. After logging off of the server program, the SQLdisconnect function terminates the terminal emulation session (step 904). This step is performed by invoking the WinHLLAPI function and passing in a parameter indicating to "disconnect presentation space."

Figure 10:
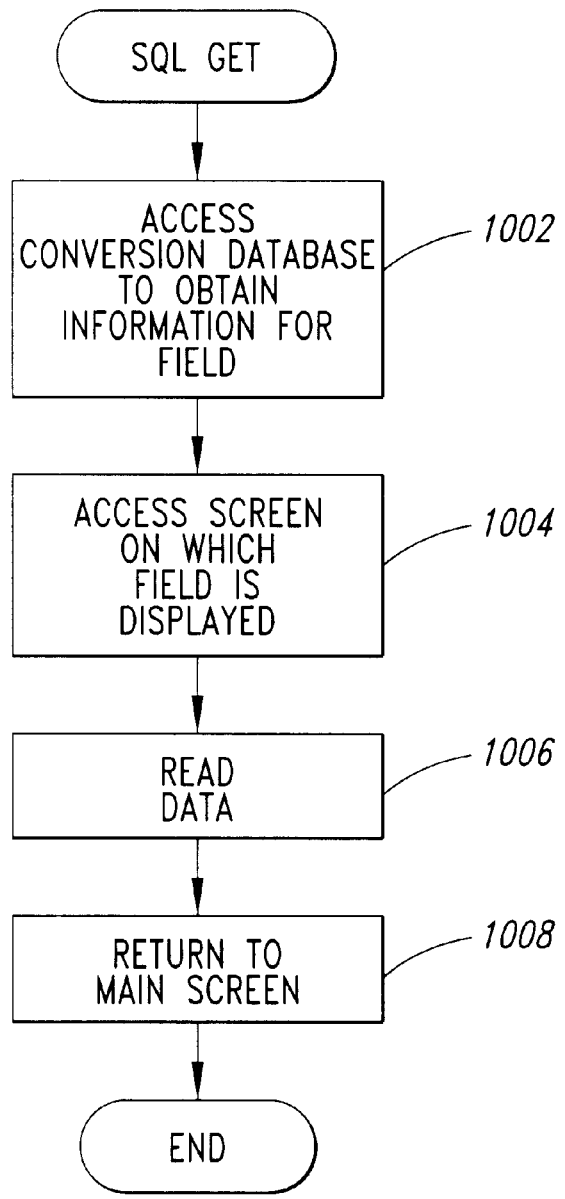
FIG. 10 depicts a flowchart of the steps performed by the SQLgetdata function of the database integrator of FIG. 3.

FIG. 10 depicts a flowchart of the steps performed by the SQLgetdata function provided by the database integrator 314 of the exemplary embodiment. The SQLgetdata function receives an indication of a field and returns the data contained in that field. The first step performed by the SQLgetdata function is to access the conversion database 320 to obtain the information for the indicated field (step 1002). In this step, the SQLgetdata function receives an identifier of the field, and the SQLgetdata function both accesses the field record 410 for the indicated field in the conversion database 320 and accesses the screen record 404 associated with the field. Next, the SQLgetdata function accesses the screen on which the field is displayed (step 1004). In this step, the SQLgetdata function accesses the screen by obtaining the commands from the screen record 404 to get to the desired screen and by passing these commands to the server program via the terminal emulation session using the WinHLLAPI sendkey and sendstring functions. After accessing the screen, the SQLgetdata function reads the data for the field as located on the screen (step 1006). Since the field record 410 contains the screen coordinates for the location of the field, the SQLgetdata function passes these screen coordinates into the WinHLLAPI copyPStoSTR function which copies the data located at the indicated screen location into a buffer, which is then returned to the client program. After reading the data, the SQLgetdata function returns to the main screen by invoking the sendkey WinHLLAPI function using the appropriate commands stored in the screen record 404 (step 1008).

Figure 11:
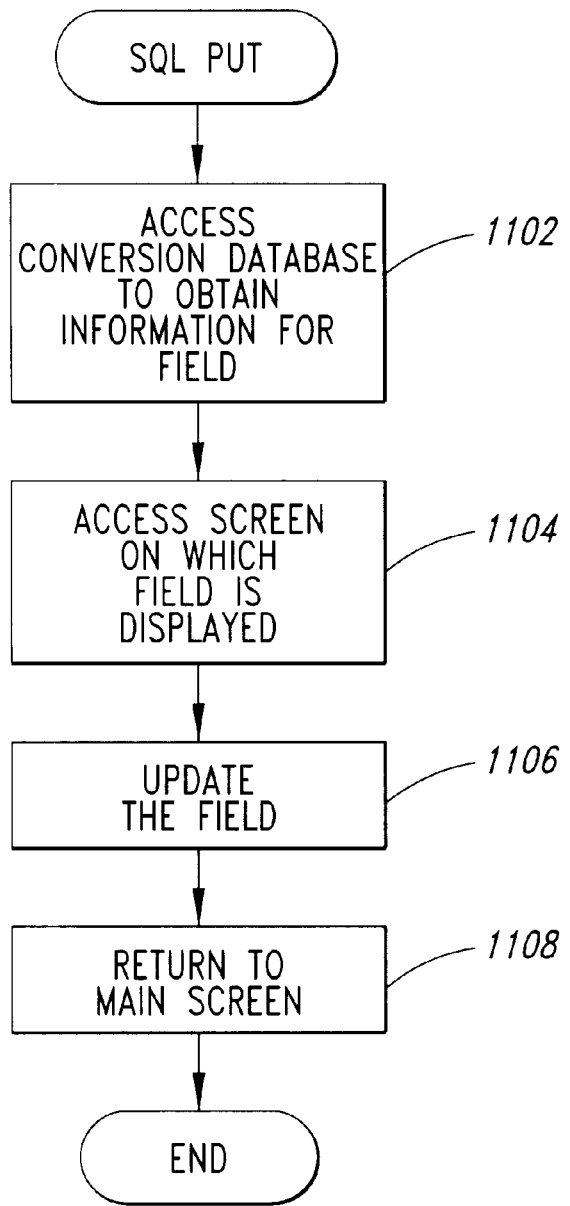
FIG. 11 depicts a flowchart of the steps performed by the SQLputdata function of the database integrator of FIG. 3.

FIG. 11 depicts a flowchart of the steps performed by the SQLputdata function of the database integrator 314 of the exemplary embodiment. The SQLputdata function receives both data and an indication of a field and then updates this field with the received data. The first step performed by the SQLputdata function is to access the conversion database 320 to obtain various information for the field (step 1102). The processing of the this step is similar to that performed relative to step 1002 of FIG. 10. After accessing the conversion database, the SQLputdata function accesses the screen on which the field is displayed (step 1104). In this step, the SQLputdata function issues the appropriate commands contained in the screen record 404 stored in the conversion database 320 to the server program via the terminal emulation session. Next, the SQLputdata function updates the field by using the screen coordinates from the field record 410 of the conversion database and invoking the WinHLLAPI copystringtoPS function (step 1106). The processing of this step overwrites the data at the designated location on the screen. At some later point, the server program updates the legacy DBMS. After updating the field, the SQL put function returns to the main screen by invoking the sendkey WinHLLAPI function using the appropriate commands contained in the screen record 404 (step 1108).

While the present invention has been described with reference to a preferred embodiment thereof, those skilled in the art will know of various changes in form and detail which may be made without departing from the spirit and scope of the present invention as defined in the appended claims.

What is claimed is:

1. A method in a data processing system for providing a client application program running on a workstation with access to data stored in a Database Management System (DBMS) of a host computer running a server application program that maintains the DBMS, comprising:

the client application program issuing a first ODBC command to a database integrator component;

the database integrator component receiving the first ODBC command and forming a connection with the server application program over a terminal emulation session with the host computer created by a terminal emulator that emulates the host computer;

the client application program issuing a second ODBC command to the database integrator component, the second ODBC command requesting access to the data stored in the DBMS;

the database integrator component receiving the second ODBC command, converting the second ODBC command into user interface commands that control a user interface of the server application program, with the user interface providing access to at least a portion of the data of the DBMS, and issuing the user interface commands to the server application program via the terminal emulation session to provide the access to the data;

the server application program receiving the user interface commands and accessing the data responsive to receiving the user interface commands;

the client application program issuing a third ODBC command to the database integrator component; and the database integrator component receiving the third ODBC command and terminating the connection with the server application program responsive to receiving the third ODBC command.

2. The method of claim 1 wherein the second ODBC command performs functionality, wherein the workstation contains a database with user interface commands that perform the functionality of the second ODBC command, and wherein converting the second ODBC command includes accessing the database and identifying the user interface commands that perform the functionality of the second ODBC command.

3. The method of claim 1, wherein the user interface displays the data of the DBMS at a location on the user interface, wherein the method further includes creating a database containing user interface commands by a navigator program receiving an indication of the location of where the data is displayed on the user interface, wherein converting the second ODBC command includes accessing the database to determine the location of where the data is displayed on the user interface, and wherein issuing the user interface commands includes issuing the user interface commands to access the data at the determined location on the user interface.

4. The method of claim 3 wherein the user interface has a plurality of screens, wherein the data is displayed on one of the plurality of screens which is not accessible, and wherein issuing the user interface commands includes issuing the user interface commands to render accessible the one screen on which the data is displayed.

5. The method of claim 1 wherein issuing the user interface commands includes issuing the user interface commands using WinHLLAPI functions.

6. The method of claim 1 wherein the server application program accessing the data includes reading the data and returning the read data to the client application program via the database integrator component.

7. The method of claim 1 wherein the server application program accessing the data includes updating the data.

* * * * *